United States Patent
Friberg et al.

(10) Patent No.: US 7,958,611 B2
(45) Date of Patent: Jun. 14, 2011

(54) METHOD FOR QUALITY CHECKING A SCREW JOINT TIGHTENING PROCESS PERFORMED BY A TORQUE IMPULSE WRENCH

(75) Inventors: John Robert Christian Friberg, Nacka (SE); Mats Cornelius Holmin, Saltsjöbaden (SE); Knut Christian Schoeps, Tyresö (SE); Torbjörn Rafael Sjöblom, Årsta (SE); Nils Gustav Erland Karlberg, Sundbyberg (SE); Christa Maria Karlberg, legal representative, Sundbyberg (SE)

(73) Assignee: Atlas Copco Tools AB, Nacka (SE)

( * ) Notice: Subject to any disclaimer, the term of this patent is extended or adjusted under 35 U.S.C. 154(b) by 302 days.

(21) Appl. No.: 11/663,257

(22) PCT Filed: Sep. 16, 2005

(86) PCT No.: PCT/SE2005/001341
§ 371 (c)(1),
(2), (4) Date: Oct. 9, 2007

(87) PCT Pub. No.: WO2006/033614
PCT Pub. Date: Mar. 30, 2006

(65) Prior Publication Data
US 2008/0178450 A1 Jul. 31, 2008

(30) Foreign Application Priority Data
Sep. 20, 2004 (SE) ........................................ 0402259

(51) Int. Cl.
*B23Q 17/00* (2006.01)
(52) U.S. Cl. .................... 29/407.02; 73/1.12; 73/862.23
(58) Field of Classification Search ............... 29/407.02; 73/1.09, 1.12, 862.08, 862.23, 865.9
See application file for complete search history.

(56) References Cited

U.S. PATENT DOCUMENTS

| 2,945,374 | A | * | 7/1960 | Simmons | 73/1.09 |
| 3,261,198 | A | * | 7/1966 | Able et al. | 73/1.12 |
| 3,456,486 | A | * | 7/1969 | Kross | 73/1.12 |
| 3,491,579 | A | * | 1/1970 | Able | 73/1.09 |
| 3,999,426 | A | * | 12/1976 | Sonderegger | 73/862.08 |
| 4,894,767 | A | * | 1/1990 | Doniwa | 700/33 |
| 5,457,866 | A | | 10/1995 | Noda | |
| 5,637,968 | A | | 6/1997 | Kainec et al. | |
| 5,703,277 | A | * | 12/1997 | Grabovac | 73/1.12 |
| 5,886,246 | A | * | 3/1999 | Bareggi et al. | 73/1.09 |
| 6,175,362 | B1 | * | 1/2001 | Harms et al. | 715/721 |
| 6,196,071 | B1 | * | 3/2001 | Shomo | 73/862.21 |
| 6,202,028 | B1 | * | 3/2001 | Crane et al. | 702/43 |
| 6,595,034 | B1 | * | 7/2003 | Crane et al. | 73/1.12 |
| 6,609,407 | B1 | * | 8/2003 | Tambini | 73/1.11 |
| 6,715,361 | B2 | * | 4/2004 | Chiapuzzi et al. | 73/760 |
| 6,848,516 | B2 | * | 2/2005 | Giardino | 173/2 |
| 7,702,493 | B2 | * | 4/2010 | Carlin et al. | 703/7 |

FOREIGN PATENT DOCUMENTS

| EP | 0 621 109 A1 | 10/1994 |
| JP | 06-206172 A | 7/1994 |
| WO | 01/47669 A1 | 7/2001 |

* cited by examiner

*Primary Examiner* — David P Bryant
*Assistant Examiner* — Christopher M Koehler
(74) *Attorney, Agent, or Firm* — Holtz, Holtz, Goodman & Chick, PC

(57) ABSTRACT

A number of pre-production calibration tightenings are performed at a screw joint identical to a screw joint used in production and using the same impulse wrench as to be used in production tightening. The value of one or more tightening related parameters are registered at the attainment of the desired pre-tension level, and those parameter values are used to statistically form a basis for a reference set-up. The tightening parameter values registered during production tightening are compared to the reference set-up, and an indication is obtained as to discrepancies between the reference set-up and the actually registered parameter values to get an indication as to whether the impulse wrench is malfunctioning and/or the screw joint is faulty.

2 Claims, No Drawings

METHOD FOR QUALITY CHECKING A SCREW JOINT TIGHTENING PROCESS PERFORMED BY A TORQUE IMPULSE WRENCH

FIELD OF THE INVENTION

This application is a U.S. National Phase Application under 35 USC 371 of International Application PCT/SE2005/001341 filed Sep. 16, 2005.

This invention relates to a method for checking the quality of screw joint tightening processes during production tightening with a torque impulse wrench of the type having a shut-off function to be set to interrupt impulse delivery to the screw joint at the attainment of a desired screw joint pre-tension level.

BACKGROUND OF THE INVENTION

A problem concerned with impulse wrenches is the difficulty to obtain an accurate and reliable measured value on the torque actually transferred to the screw joint and the pre-tension level actually obtained in the screw joint. Due to the fact that the tightening torque is transferred to the screw joint via short dynamic impulses, torque values measured by an in-line torque transducer does not give a true information of the pre-tension level obtained in the screw joint. The obtained torque measurements, however, quite well reflect the accomplished pre-tension level in the screw joint at repeated tightening of identical screw joints with the very same impulse wrench and do indicate quite accurately occurring deviations in the accomplished pre-tension of the screw joint.

SUMMARY OF THE INVENTION

Instead of relying on the indications of a torque transducer for determining the accuracy of the obtained pre-tension in a screw joint being tightened, the method according to the invention is based on checking the accuracy in tightening process repetitions when tightening a number of identical screw joints by means of one and the same impulse wrench. By checking the measured value of one or more tightening related parameters against set up reference values, which have been previously determined to be representative of a correct tightening process, it is possible to determine whether the actual tightening process is a correct repetition of that correct tightening process and, hence, is a correctly performed tightening process resulting in a desired pre-tension level in the screw joint.

In particular, the invention relates to a method for monitoring screw joint tightening processes via repetition checking of tightening related parameter values against values determined during a pre-production calibration process, wherein a number of calibration tightening processes are performed on a screw joint identical to the screw joints to be tightened during production and using the very same impulse wrench as to be used in production. During this calibration process it is determined which tightening parameter values will result in an acceptable tightening process, i.e. which tightening parameter values will result in a desired pre-tension in the screw joint during production tightening. The resulting pre-tension levels obtained at the calibration tightenings are checked by any other accurate and reliable means, for instance a manual torque wrench. The tightening parameter values actually resulting in the desired pre-tension level in the screw joint with an acceptable accuracy are determined during the pre-production calibration process and are used for statistically calculating limit values to form a reference set-up for checking process repetition during production tightening.

DETAILED DESCRIPTION

In order to describe the method according to the invention in further detail an example is described below.

For production tightening of a certain type of screw joint to a desired predetermined pre-tension level there is chosen a torque impulse wrench of a suitable size and having a mechanical shut-off means to be set to discontinue tightening at the attainment of the desired pre-tension level. The impulse wrench is also equipped with an output torque sensor for indicating the level of the delivered torque to the screw joint, and an angle encoder for registering the angular movement of the output spindle. The angle sensor may very well be arranged to indicate the angular movement of the drive member of the impulse unit, and a calculating means is provided to calculate the lapsed angle of the output spindle. See for instance WO 02/083366 which also describes how to use the measurement values obtained by the angle sensor for calculating the output torque magnitude of the impulse wrench such that an inline torque transducer can be omitted. The impulse wrench is connected to a stationary programmable control unit for controlling and governing the operation of the wrench.

Due to the difficulty to obtain a correct measurement of the torque transferred to the joint and the pre-tension actually obtained in the screw joint, the operator has to perform a pre-production calibration process wherein a number of calibration tightenings of a screw joint identical to the screw joint to be tightened during production are performed, and the measured output torque values obtained during these calibration tightenings are checked by means of a manual torque wrench. Then, the shut-off point of the mechanical shut-off means is adjusted so as to stop tightening at the attainment of a torque level resulting in the desired pre-tension level in the screw joint.

When having finally adjusted the shut-off means to stop tightening at a point resulting in a correct pre-tension level in the screw joint a number of tightening related parameter values corresponding to that correct tightening level are registered and saved in the control unit. These parameters may be the indicated output torque value, the total lapsed rotation angle of the output spindle, the total number of delivered impulses, the air line pressure in case of a pneumatic wrench, the temperature of the impulse unit etc.. After a number of calibration tightenings there is obtained a number of values with a certain scattering for each one of these tightening related parameters, and based on these statistic values there are set up reference limit values for each one of the parameters within which the production tightening values shall be for getting an o.k. signal from the control unit at each production screw joint tightening.

The basic idea of the invention is to look at the variations of a number of tightening related parameter values rather than trying to directly measure the installed torque or pre-tension level of the screw joint, which would give an unreliable result, inter alia due to the dynamic torque transfer inherent in the impulse technique. As long as the indicated tightening parameter values are within the statistically determined reference limits at the end of each tightening process you know from the pre-production calibration tightening process that the pre-tension of the screw joint is correct. Should anyone or more of these limits be passed you know that there is something wrong with the impulse wrench and/or the screw joint and that the tightening result most probably is incorrect.

The invention claimed is:

1. A method for quality checking a screw joint tightening process at production tightening of a screw joint using a torque impulse wrench having a shut-off function to be set to interrupt torque impulse delivery as a desired screw joint pre-tension level is attained, comprising:

tightening in a pre-production calibration process a number of screw joints identical to said screw joint using the impulse wrench to be used during production tightening;

registering, during tightening of said number of screw joints, a scattering of values of at least one tightening parameter at attainment of the desired pre-tension level;

forming a reference set-up including at least one statistically determined limit value based on the scattered values of the at least one tightening parameter registered at ends of the pre-production tightenings, the at least one limit value reflecting a correctly functioning impulse wrench and a correct screw joint;

comparing the at least one limit value of the reference set-up with a value of the at least one tightening parameter actually obtained during the production tightening, and indicating an occurring discrepancy between the value of the at least one tightening parameter actually obtained during the production tightening and the at least one limit value of the reference set-up as an indication of at least one of a malfunctioning impulse wrench and a faulty screw joint.

2. The method according to claim 1, wherein the at least one tightening parameter is a plurality of tightening parameters, comprising rotation angle and a number of delivered torque impulses.

* * * * *